No. 817,786. PATENTED APR. 17, 1906.
M. KUN.
ADDING MACHINE.
APPLICATION FILED JAN. 12, 1904.

9 SHEETS—SHEET 1.

No. 817,786. PATENTED APR. 17, 1906.
M. KUN.
ADDING MACHINE.
APPLICATION FILED JAN. 12, 1904.

9 SHEETS—SHEET 2.

Witnesses
John L. Lotsch
Dno. Robt. Taylor

Inventor
Michael Kun,
By Dyrenforth & Dyrenforth
Attys.

No. 817,786. PATENTED APR. 17, 1906.
M. KUN.
ADDING MACHINE.
APPLICATION FILED JAN. 12, 1904.
9 SHEETS—SHEET 3.
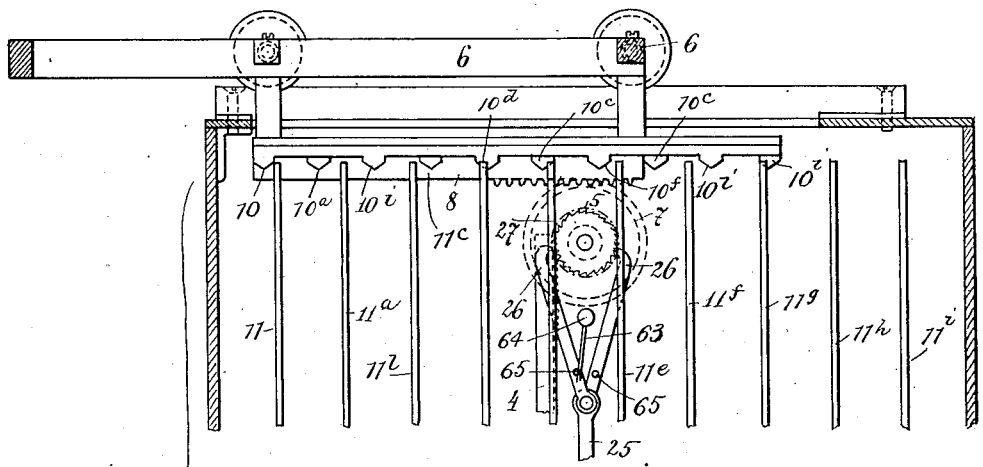
Fig.3
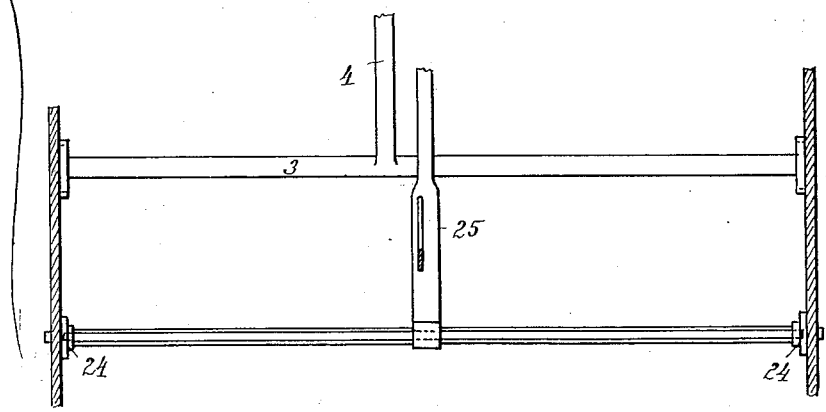
Witnesses
Inventor
Michael Kun

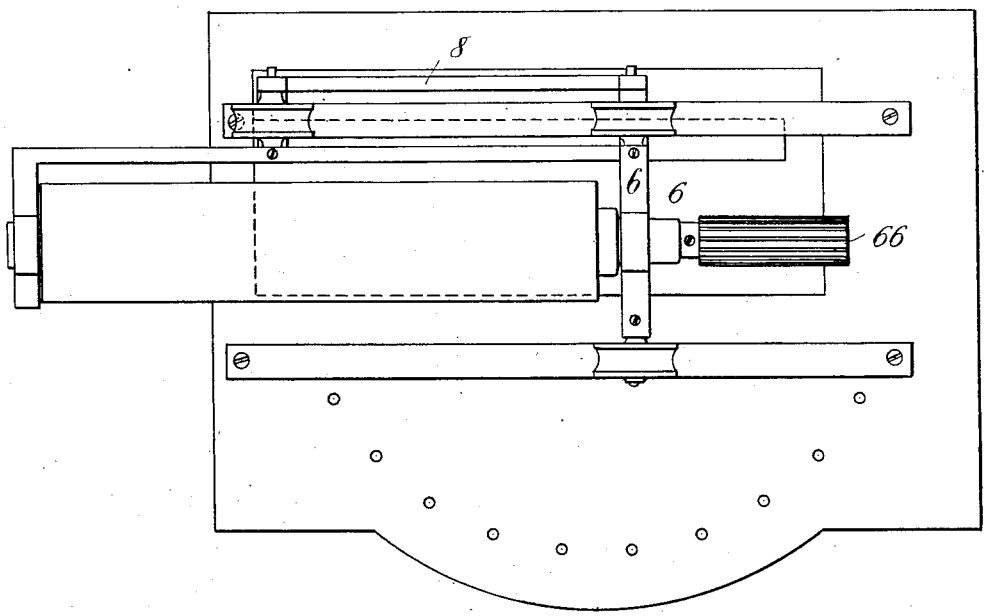

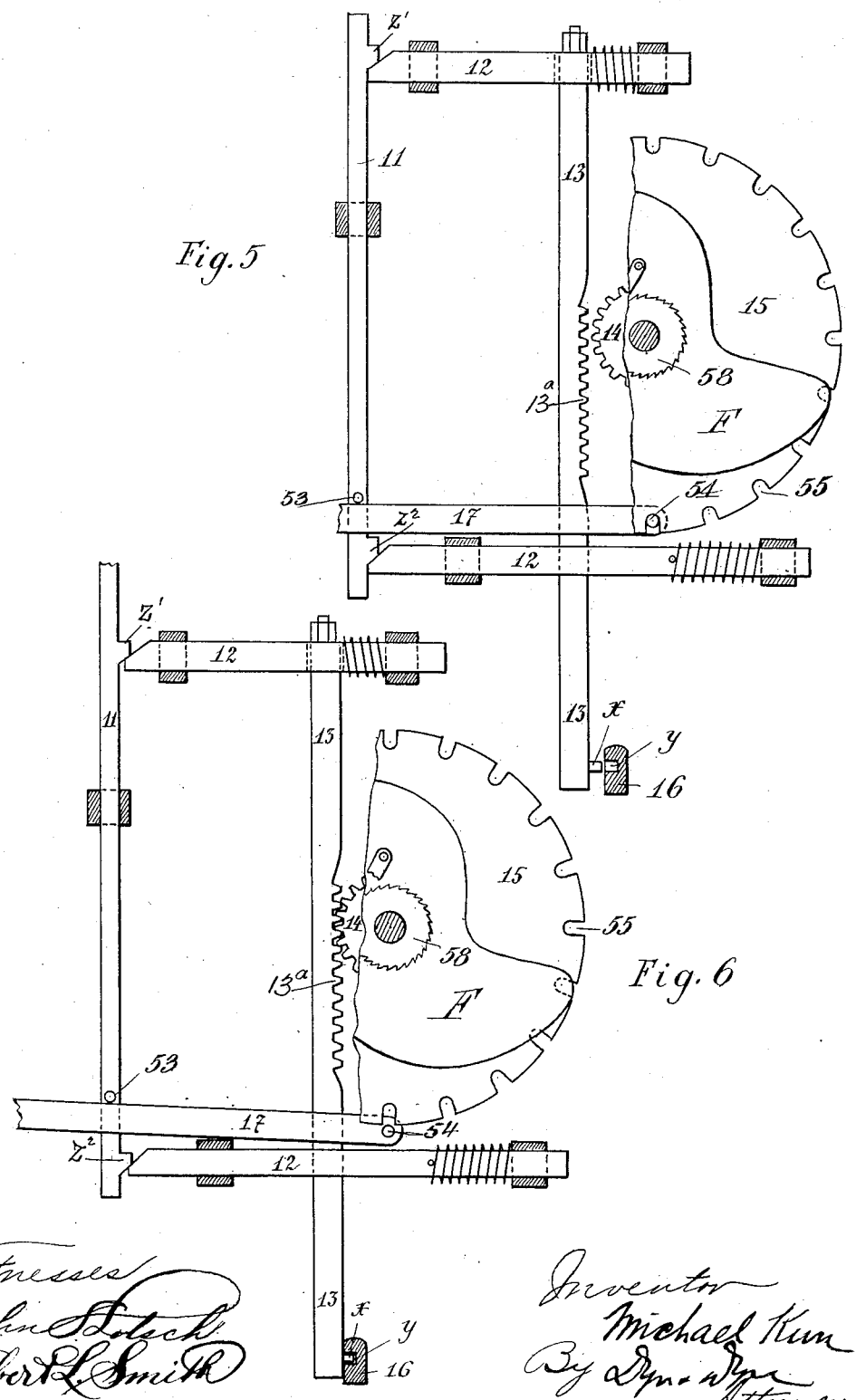

No. 817,786. PATENTED APR. 17, 1906.
M. KUN.
ADDING MACHINE.
APPLICATION FILED JAN. 12, 1904.
9 SHEETS—SHEET 6.
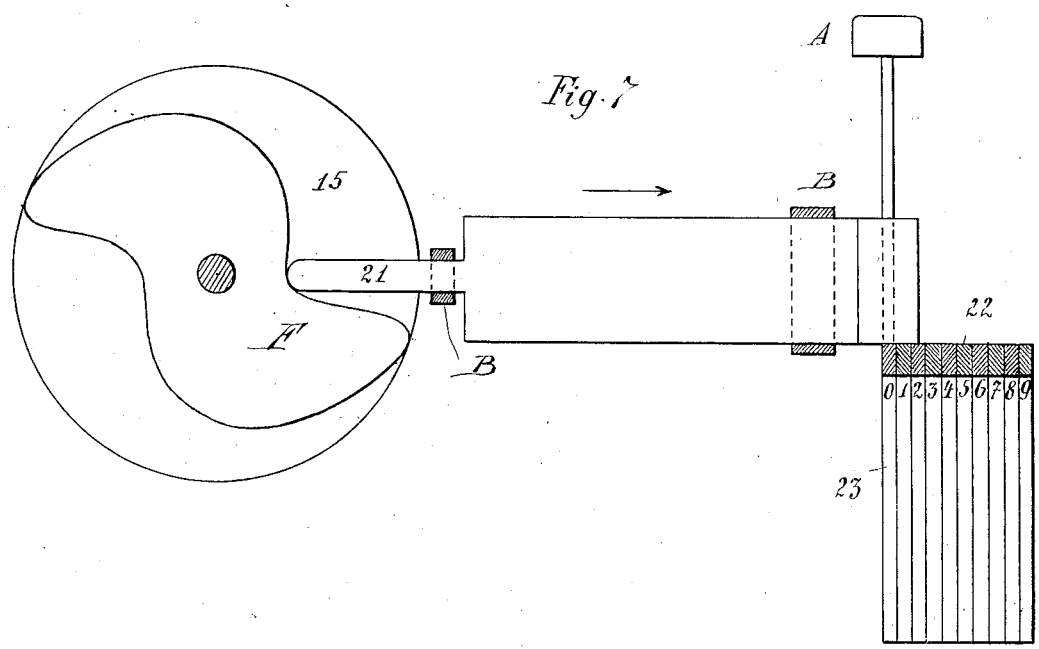
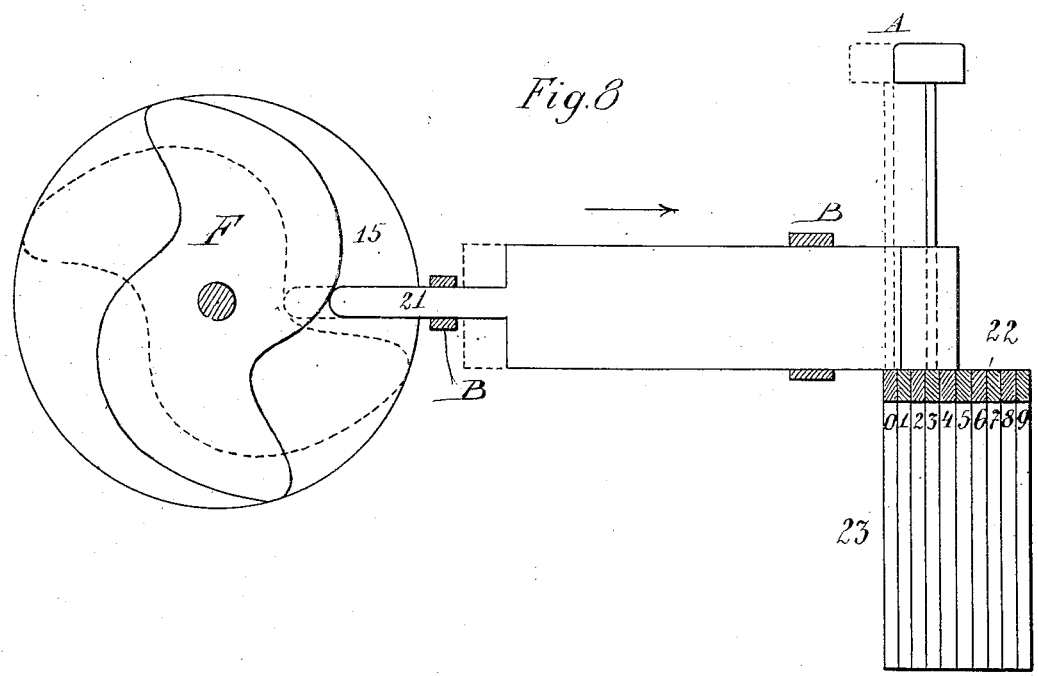

No. 817,786. PATENTED APR. 17, 1906.
M. KUN.
ADDING MACHINE.
APPLICATION FILED JAN. 12, 1904.

9 SHEETS—SHEET 7.

Witnesses
John P. Dotsch
Albert L. Smith

Inventor
Michael Kun
By his Attorneys

No. 817,786. PATENTED APR. 17, 1906.
M. KUN.
ADDING MACHINE.
APPLICATION FILED JAN. 12, 1904.
9 SHEETS—SHEET 8.
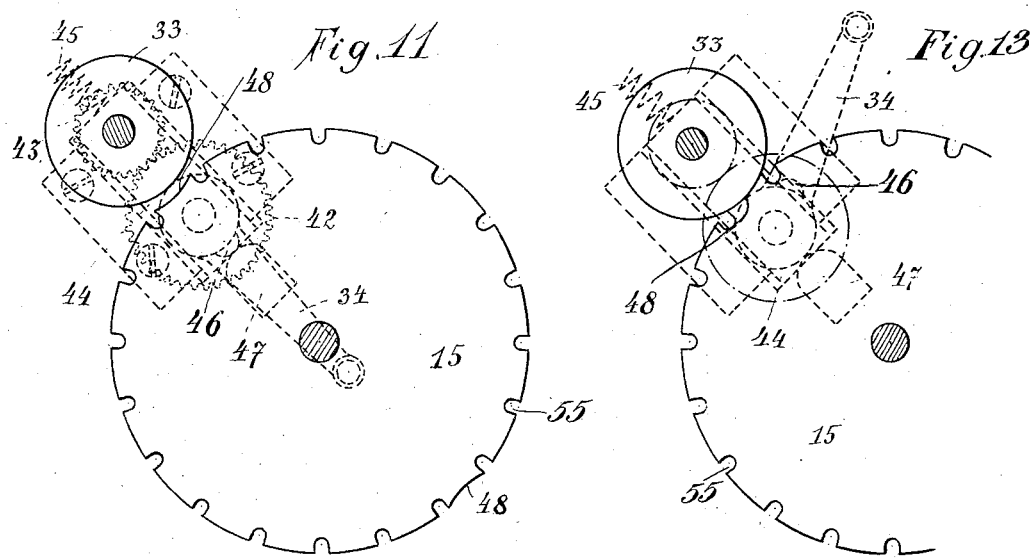
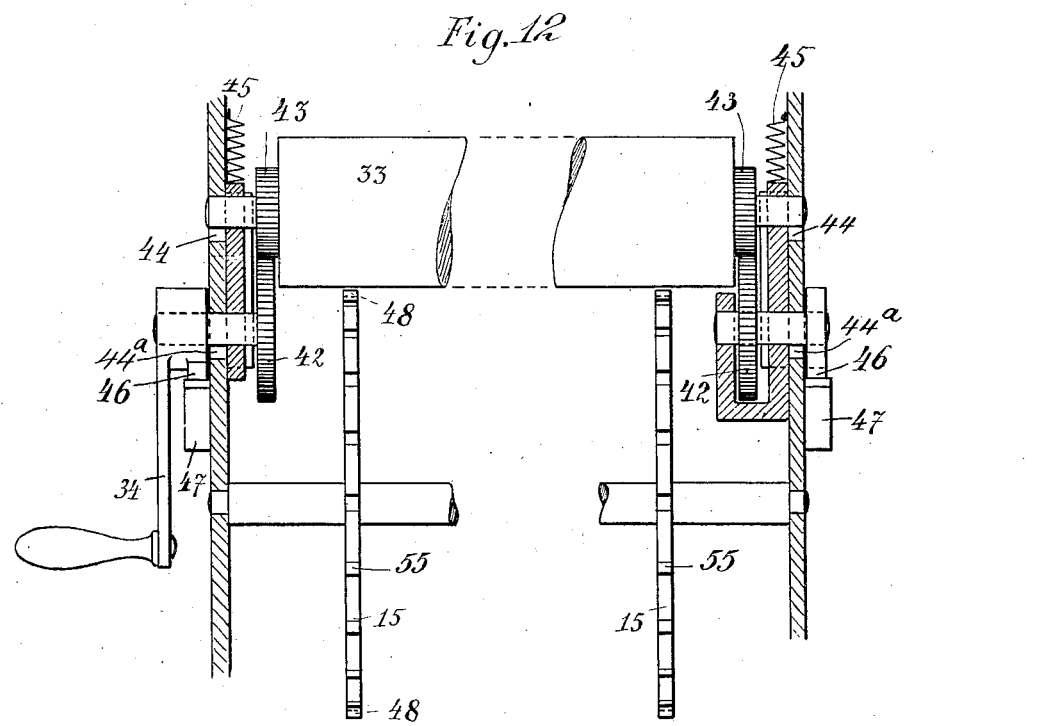

No. 817,786. PATENTED APR. 17, 1906.
M. KUN.
ADDING MACHINE.
APPLICATION FILED JAN. 12, 1904.

9 SHEETS—SHEET 9.

Witnesses
John F. Koch
Samuel C. Pearce

Inventor
Michael Kun,
By Dyer & Dyer
Att'ys

UNITED STATES PATENT OFFICE.

MICHAEL KUN, OF BUDAPEST, AUSTRIA-HUNGARY, ASSIGNOR TO L. & G. HALPHEN, OF PRAGUE, AUSTRIA-HUNGARY, A FIRM.

ADDING-MACHINE.

No. 817,786.　　　Specification of Letters Patent.　　　Patented April 17, 1906.

Application filed January 12, 1904. Serial No. 188,756.

*To all whom it may concern:*

Be it known that I, MICHAEL KUN, a subject of the Emperor of Austria - Hungary, and a resident of Budapest, in the Empire of Austria - Hungary, have invented a certain new and useful Improvement in Adding-Machines, of which the following is a specification.

The object I have in view is the production of an adding type-writer that will print a column of figures and the sum-total thereof by a single set of printing-types, but actuated by different sets of keys.

In order to more clearly understand the nature of the invention, attention is directed to the accompanying drawings, which show one embodiment of the invention, and in which—

Figure 1:
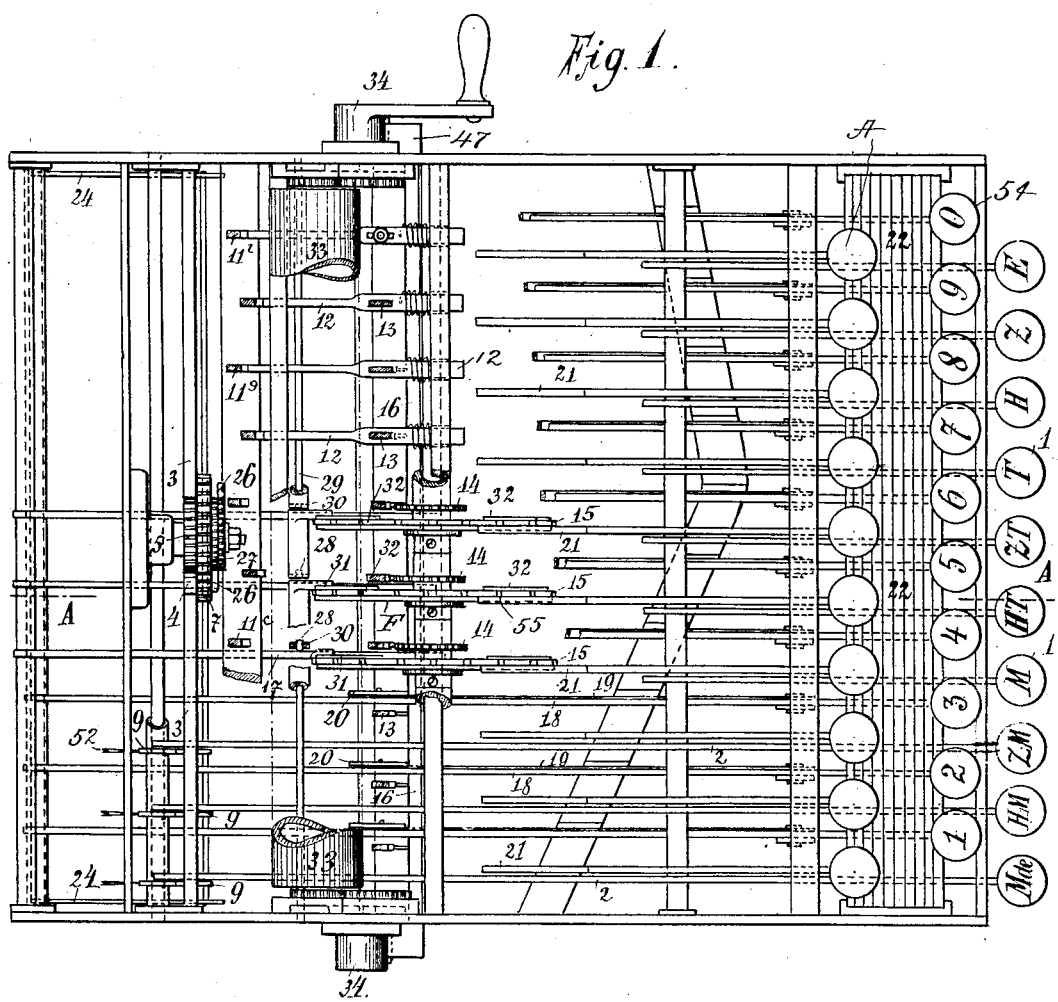
Figure 2:
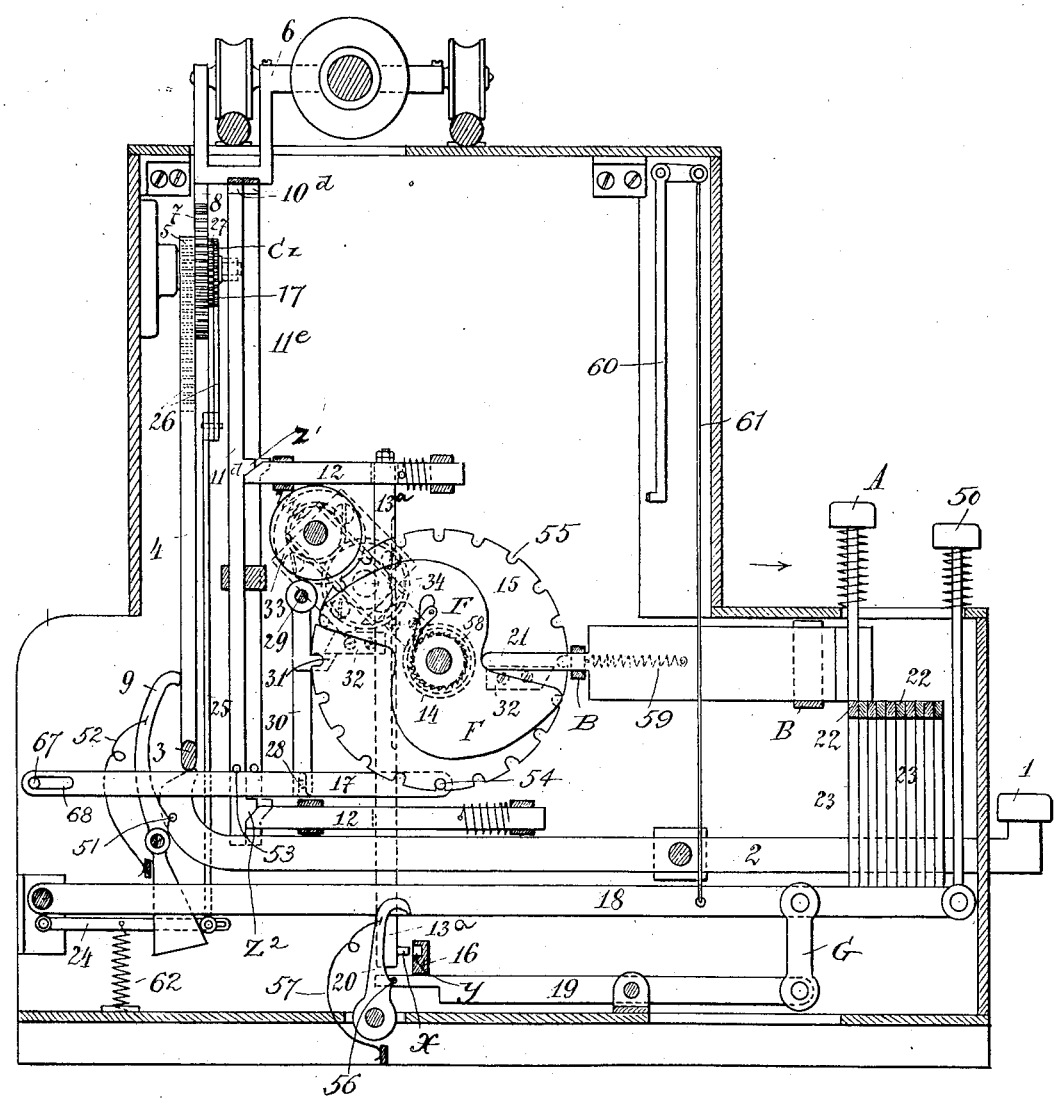
Figure 9:
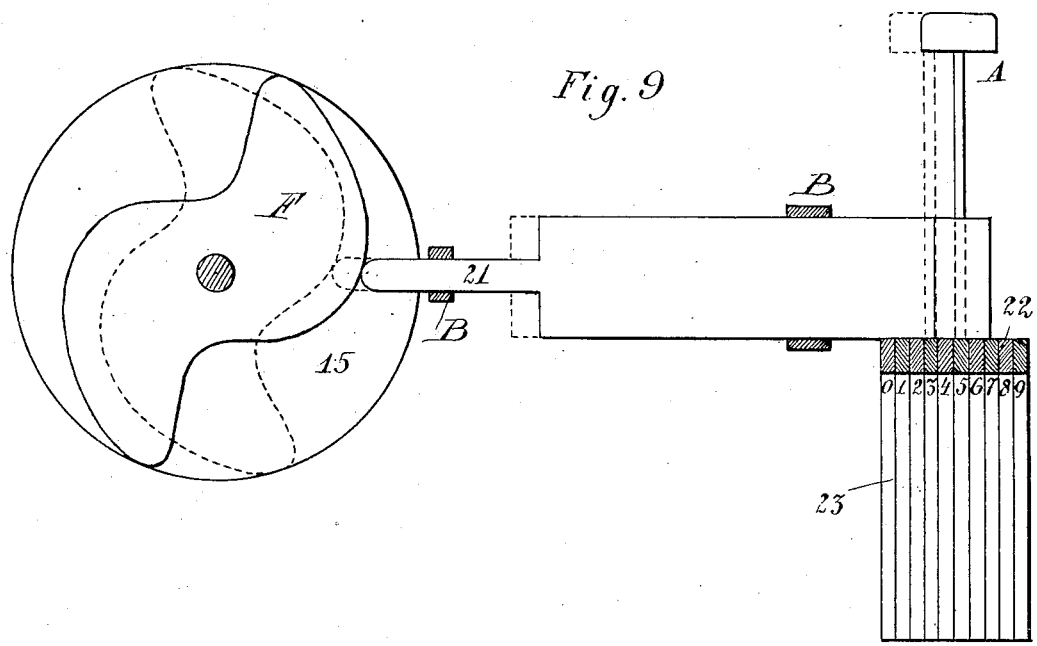
Figure 10:
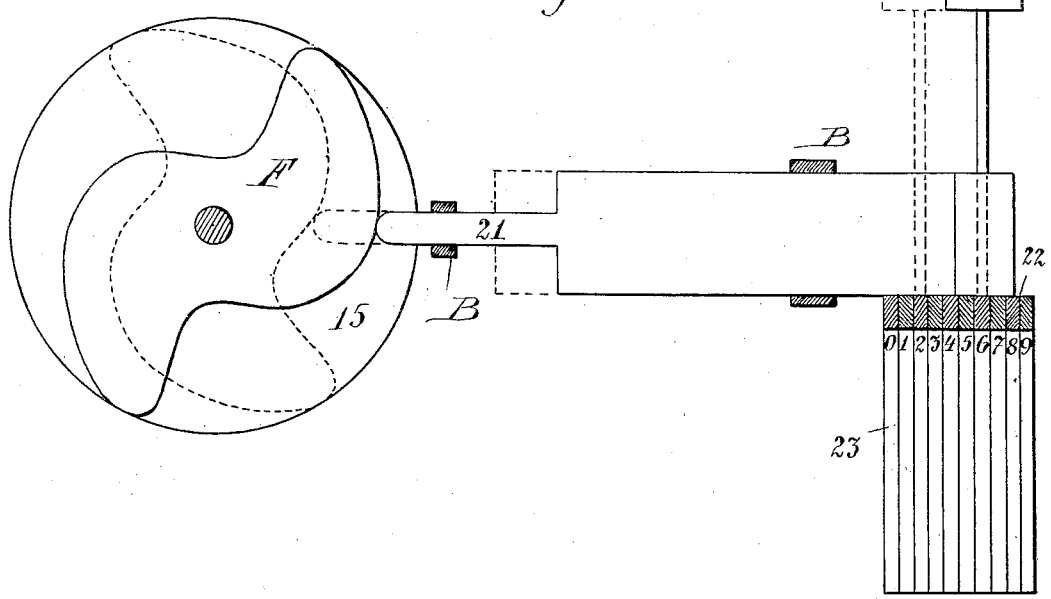
Figure 14:
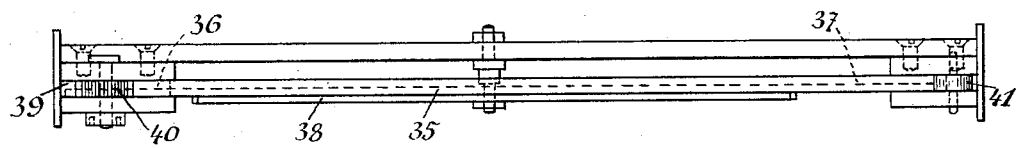

Figure 1 is a plan view of the apparatus, showing the carriage removed. Fig. 2 is a section on the line A A of Fig. 1. Fig. 3 is a back view of the machine with parts broken away. Fig. 4 is a plan of the machine, showing the paper-carriage. Fig. 5 is an enlarged view of the rack and pinion for actuating the notched disk, the rack and pinion being out of engagement. Fig. 6 is a view of the same parts, the rack and pinion being in engagement. Fig. 7 is an enlarged view of the parts of the mechanism comprising the gibbous cam, a sum-key, and bridges in the neutral position. Fig. 8 is a view of the same parts, but showing the mechanism in the position assumed after the operation indicated by the equation 0 plus 3 equals 3 has been performed; Fig. 9, the same view, parts in the position in which 3 plus 2 equals 5 has been performed; and Fig. 10, the same in which the operation indicated by the equation 2 plus 4 equals 6 has been performed. Figs. 11 to 13 show the arrangement for returning the mechanism to the neutral position after a column of figures has been printed and the sum thereof secured. Fig. 14 is an end view, and Fig. 15 a plan view, of the parallel guide for the cross-bars, ridges, and yokes.

In all views like parts are indicated by the same reference characters.

In carrying out my invention I provide a machine wherein three rows of keys are used, the downward movement of which is arranged to effect the actuation of the carriage mechanism. The lower row of keys, as shown in the drawings, serves the purpose of adjustment of the carriage to the desired position of the number or unit value with relation to the corresponding notched disk 15. The middle row of keys 50 serves the purpose of actuating the type-lever 60 (by the connecting-rod 61) to print the individual items and control the notched disks 15 and rotate them to the extent corresponding to the amount to be added. These disks in their turn influence the upper third row of keys through the agency of the tongues 21, which keys serve for the printing of the sums by the actuation of the same type through the agency of the bridges 22.

In the lowest row of keys 1, which serve for the adjustment of the carriage, the individual keys are provided with a value indication, thus: "E," "Z," "H," "T," &c., indicating units, tens, hundreds, thousands, &c. The individual keys 50 of the middle row will have the impression of the individual items or figures, and they bear the designations "0," "1," "2," "3," "4," "5," "6," "7," "8," "9," each key having one of the figures from "0" to "9," and each of these keys is in connection with a type-lever carrying the corresponding figure.

The sum-keys—that is to say, the uppermost row of keys A—bear no sort of designation. They may be white, black, or otherwise colored. It is to be understood that they are carried by the tongues 21 and are moved backward and forward over the bridges 22 and serve the purpose of printing the sum-totals. Each of the sum-keys is arranged to print any figure from "0" to "9," depending upon its position. Since the position of the sum-keys in each row is unchangeable from left to right, it is of course possible to provide the individual keys with indications of position—as units, tens, hundreds, or thousands—similar or corresponding to the lowest row of keys from right to left, as will be evident.

At the beginning of a calculation that key of the row of keys 1 which—for example, the thousandths - key—is placed at that three-point number which corresponds to the highest unit of the item to be printed and added. On the depression of a key of the row 1 the projection of the free end of the key-lever 2 is elevated. The projections located on the free ends of the lever 2 of the unit-keys are all upon the same horizontal plane and in a straight line. Upon these projections rests a cross-bar 3, parallelly guided in a suitable manner. To this cross-bar is firmly connected a perpendicular rack 4, which meshes with a small pinion 5, arranged below the paper-carriage 6. Secured to the small pinion 5 is a second pinion 7, which meshes with a horizontal rack 8, Fig. 3, carried upon the paper-carriage. If now by pressure of the unit-key the cross-bar 3 is lifted by engagement with the projection on the end of the key-lever, the rack 4 causes a rotation of the pinion 5 and 7, and therefore by means of the rack 8 a displacement of the paper-carriage 6. At the same time upon the depression of one of these unit-keys and the rotation of the key-lever a restraining-catch 9, previously forced back into the position of rest by a pin 51, located on the free end of the key-lever, is released and forced by the effect of a spring 52 into the path of the cross-bar 3, whereby the upward movement of the latter is limited. These restraining-hooks 9 are of different lengths, so that the strokes of the two levers of the individual unit-keys have a different and exactly-determined magnitude. By this limitation of the movement of the keys the movement of the rack 4, and therefore that of the paper-carriage 6, is exactly limited—that is, the latter is adjusted exactly corresponding to the depressed unit-key.

Below the carriage and firmly connected thereto, so as to move therewith, is a double row of wedges 10 $10^a$ $10^b$ $10^c$ $10^d$ $10^e$ $10^f$ $10^g$ $10^h$ $10^i$, which wedges are so arranged that upon the movement of the carriage each of them will engage the upper end of one of the operating-bars 11 $11^a$ $11^b$ $11^c$ $11^d$ $11^e$ $11^f$ $11^g$ $11^h$ $11^i$, which are situated below them and depress it. The wedges 10 and the operating-bars 11 corresponding thereto are arranged in two rows in order to avoid at any time two or more wedges coming in contact with two or more operating-bars when the paper-carriage is adjusted. The necessity of arranging the wedges in two rows is made clear by the circumstance that the elements—the gibbous cams, bars, &c.—are separated from each other by a minimum distance, in practice about twenty-two millimeters. The carriage, however, permits a displacement of about five millimeters width corresponding to the distance of the figures. This being so, the first wedge-point 10 is four millimeters distance from the first operating-bar 11, the second wedge-point $10^a$ eight millimeters from the second operating-bar $11^a$, the third wedge-point $10^b$ twelve millimeters from the third operating-bar $11^b$, &c., each wedge-point being about four millimeters in advance of the other. This being so, the operating-bars 11 $11^a$ to $11^i$ will be only twenty-two millimeters from each other and the first wedge 10 will come into operation by a movement of about two millimeters of its oblique plane. Upon the movement of the sixth operating-bar $11^e$, which is actuated by a wedge-point $10^e$, separated from it by twenty-four millimeters, (since the first wedge 10 is removed as to its tip, 4 plus 22,) twenty-six millimeters from the second rod $11^a$,) and therefore on the sixth movement of the carriage, caused by the sixth-key pressure, an undesirable arrangement would result if the wedges and bars were in a single line. The same results would be secured with the other wedges, and this is avoided by placing the wedges in two rows, so that one of the operating-bars will be separated from the others in the same row by a displacing difference as far (2 multiplied by 22, thus 44 millimeters) so that with eleven elements, and therefore with the eleventh movement of the carriage, (11 multiplied by 4 equals 44,) no undesirable movements of the operating-rods will result.

Upon each of the perpendicular operating-rods 11 is located at any desired distance from each other two cam projections $Z'$ $Z^2$, and at the end of each rod is a pin 53. These two cam projections are arranged to come into contact with two horizontal push-bars 12 when the operating-levers 11 $11^a$ to $11^i$ are depressed by the wedges 10 $10^a$ to $10^i$, which push-rods each carry one of the perpendicular racks $13^a$. By the simultaneous movement of the two horizontal push-bars 12 on the depression of the corresponding operating-lever 11 $11^a$ to $11^i$ by the carriage 6 through the action of the wedges 10 $10^a$ to $10^i$, the corresponding rack $13^a$ is brought into engagement with a pinion 14, secured to the notched disk 15 at the same time the pin located at the lower end of the perpendicular rod $13^a$ on the movement of the rack comes into engagement with a groove $y$, located in a suitably-arranged parallelly-guided cross-bar 16. The pin 53, located on the operating-lever 11, is arranged so that, in addition to the cam projections $Z'$ $Z^2$, it will by means of the depression of lever-arm 17 cause the pin 54, located on the end of the same, to come out of engagement with the notches 55 on the periphery of the disk 15 and release the latter. The notched disk 15, which corresponds to the unit-key, is in operation, which now on the outward movement of the rack $13^a$ is partially rotated.

It is to be understood that the rotation of the notched disk is secured first by the pressure of the key of the middle row of keys—that is to say, the type-keys. On the depression of one of these keys an impression of the suitable figure corresponding to the key is made with the assistance of levers located on these keys, each one of which bears the figures "0" to "9," which correspond with the designation upon the key itself. Between these keys, on the one hand, and the notched disks 15, on the other hand, are inserted intervening mechanism which may be constructed as follows and operated in the following manner: Intermediate the end of the type-lever 18 is connected, through a link G, a double lever 19, on the free end of which at an equal height with the ends of the remaining levers 19 and in a straight line therewith rests the cross-bar 16. The latter is in engagement with the pin of the horizontally-moved rack-bar 13 by means of the above-mentioned groove $y$. On the upward movement of the free end of the double lever 19 the rack $13^a$ is caused to move upward, and since it is in engagement with the pinion of the corresponding notched disk 15 rotates the latter to a fixed extent, corresponding to the stroke of the type-lever 18 or of the double lever 19. The length of this stroke corresponds to each individual movement, which is determined by a suitable limiting arrangement. As shown in the drawings, this device consists of a catch or hook 20, which is effected by the pressure of a pin 56, carried by the lever 19, which forces it out of the path of the cross-bar 16 against the tension of the spring 57, and so it will exactly define the point up to which the rack $13^a$ can be raised and the extent to which the notched disk may be rotated determined. A backward movement is prevented by a pawl-and-ratchet wheel 58, connected to each of the notched disks.

On one side of each of the notched disks 15 is arranged a double cam F. Against these cams are engaged the tongues 21, which carry the upper row of keys. This action is secured by means of springs 59. The keys are so fixed upon the tongues 21, which are adjusted in guides in a horizontal direction, that upon being depressed each forces down one of the bridges 22. At each rotation of the notched disk the tongue 21, and with it the proper sum-key, is pushed farther over the bridge 22 in the direction of the arrow, while after passing the outermost point of the cam F it is slid back again to the first bridge by the spring-pressure. In Figs. 7, 8, 9, 10 the position of the notched disks and sum-keys at 0 plus 3 equals 3, 3 plus 2 equals 5, and 2 plus 4 equals 6, respectively, are shown. The bridges are in contact with the corresponding type-lever 18, as by means of a foot 23. The disk 15 has twenty notches in its periphery, and the cam E two points. This will reciprocate the tongue 21 twice during each revolution of the disk. The number of notches and points in the cam can be varied as is necessary or desirable.

Upon the depression of a key of the middle row an oscillating frame 24, located under the lever 18, is moved with the lever 18 against the resistance of a spring 62. This frame is in engagement, by means of a rod 25 and clutches 26, with a ratchet-wheel 27 on the shaft of the pinions 5 and 7, and the parts are so arranged that at each upward movement of the bar 25 after the cessation of the pressure upon a lever 18—that is to say, upon the release of a key—the ratchet-wheel 27 is rotated the distance of a single tooth. By the rotation of the ratchet-wheel 27 by the distance of a tooth the paper-carriage, and with it the pinion 7, is rotated and the rack 8 is automatically moved to its position for the next lowest unit which is to be printed by the type-key. The clutch is provided with two arms, either of which can be disengaged by a finger 63, carried on a shaft 64, the finger coming into engagement with a pin 65, carried by each of the clutches 26, so that the direction of rotation of the wheel can be controlled. By means of this movement of the paper-carriage 6 the operating-bar 11 $11^a$ to $11^i$ corresponding to the next unit is depressed by means of the corresponding wedge 10 $10^a$ to $10^i$, whereby it results that the notched disk 15 of the next lower unit is put in position for rotation upon the depression of a type-key. Another figure is printed by pressure of this key and a corresponding sum-key is affected. The paper-slide 6 progresses farther again automatically for a lower unit, whereby the same process is repeated. In the same manner the mechanism works also in the opposite direction, so as to increase from the smallest unit, when the locking-wheel is reversed by the aid of the catch which is seen in the drawings, Fig. 3.

In the preceding observation of the method of operation the impression of the first row of figures of an item was rendered apparent. The item standing under it after the paper is moved forward for the next row of numbers, by hand or by a suitable mechanism, such as the thumb-wheel 66, is printed in the same way, since first the proper unit-key and then the necessary type-keys are depressed.

It is plain from the above that in a repetition of this process with the same units the same notched disks are rotated by the amount corresponding to the figures to be added. At the same time also the tongues of the sum-keys are pushed forward one after the other over the bridges by these individual amounts, whereby an automatic addition of the same units is effected. Since, however, in this addition the passing beyond the unit must be regulated, a special device is necessary for this purpose.

Each of the notches 55 in the disk 15 is arranged to engage with a pin 54, carried upon the free end of the lever 17, the latter being supported by a pin 67, engaging with a slot 68 and so arranged as to be moved upon the pin. As already described, the lever-arm 17 is moved by the downward movement of the pin 53 on the corresponding perpendicular bar 11 to release the corresponding notched disk. Upon the lever-arm 17 is located another pin 28, which engages in an open slot formed in the lower end of an arm 30, mounted upon an axle 29. This arm 30 is rigidly connected with a catch 31, which may come in contact with a projection 32 on the adjacent notched disk corresponding to a lower unit, in such a way that each time when the tongue 21, carrying a sum-key, has been pushed into its outermost position by engagement by the cam F on this disk is returned to its neutral position by its spring, the catch 31 is forced back by being engaged by the projection, and carrying with it the arm 30 of the arm 17, which is connected with the notched disk corresponding to the next higher unit, the notched disk is shifted forward one unit. The distance of the notches on the disk are suitably calculated in order to retain again the proper cam in its position, after being pushed forward by the pin 54 on the lever-arm 17, until the proper downwardly-moving rod 11, $11^a$ to $11^i$ effects anew the release of the proper disk. In this manner every time when a gibbous cam is at the end of its movement from neutral position to neutral position the passing beyond the unit is noted by means of the notched disk corresponding to the next higher unit, which in turn acts upon the corresponding tongue of the sum-key. After the sum-keys are automatically moved along by means of the gibbous cams during the imprinting of the items to be added to the bridges corresponding to the sum the printing of the sum may take place. For this purpose the carriage, which has returned to the next position of the printing on the next item, must be again pushed forward by a pressure on the corresponding unit-key 1 until the units come in the right row. In order, therefore, to get the slide in the right row, that unit-key will be pressed which corresponds to the unit of the sum-key farthest to the left, which is pushed forward. Then in addition to the sum-key which has been moved farthest corresponding to the highest place value to the left the other sum-keys corresponding to the lower units are depressed. The sum-keys acting upon the bridges 22, located beneath them, which act by their feet 23, on depression on the corresponding levers 18 will successively operate them. Since each bridge corresponds with a certain lever 18 and the sum-keys are directly over the bridges corresponding to the figures of the sum, exact printing of the sum can be thereby effected.

Figure 15:
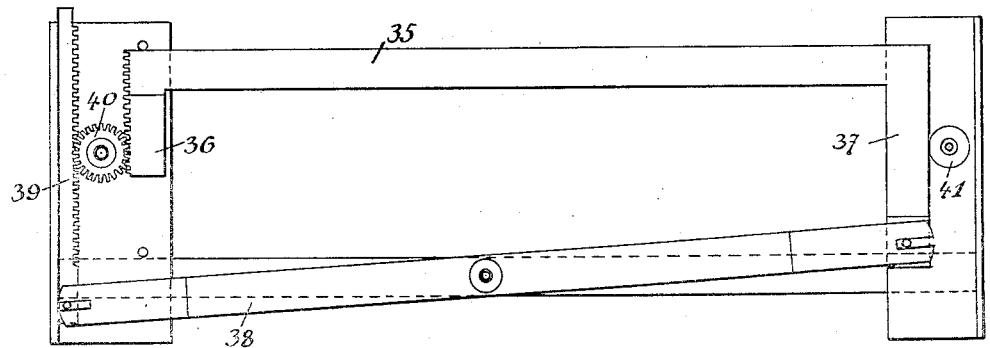

After the sum-total has been printed it is necessary to bring the apparatus back to the neutral position. For this purpose a cylinder 33 is provided and is arranged opposite the notched disks. This cylinder is rotated by means of a crank 34. The cylinder, together with its crank 34 and transmission-wheels 42 and 43, is adjustable in slots 44 $44^a$ in the casing in such a manner that, together with a spring 45, so located that when a projection 46, which is provided on the crank 34, comes opposite a projection 47, fixed on the casing of the apparatus, the cylinder 33, with its bearings, will be pressed back against the tension of the spring 45 to such an extent that its surface will not touch the periphery of the notched disks 15. After the crank 34 is turned, as shown in Fig. 15, the projection 46 on the same slides down from the fixed projection 47 on the casing and the cylinder 33, by means of the spring 45, is pushed against the notched disks 15 in such a manner that it comes in contact with the periphery of the same. If now the crank 34 is rotated farther, all of the notched disks are rotated, and this will continue until a circular depression 48 on the periphery of the disk reaches a point opposite the cylinder 33. They will then be rotated no farther, since the engagement with the depression 48 will act as a lock. After the notched disks, therefore, are differently adjusted after a calculation is finished all the disks on the rotation of the cylinder a sufficient number of times to correspond to a complete rotation will be in a position where their circular depressions lie opposite the cylinder—that is, in their neutral position. The correct neutral position will be obvious from the position of the sum-keys, which must also be in neutral position when the notched disks are in the neutral position. This will therefore serve as an additional means to indicate that the device is in the neutral position.

In operation the movement transference from the crank 34 to the cylinder 33 may be arranged in such a way that the notched disks will make one complete revolution exactly on one rotation of the crank—that is, the notched disks covering the greatest path must certainly reach their neutral position. At the same time the projections 46 on the crank 34 reaching again the fixed projection 47 will bring the cylinder 33 again out of engagement with the notched disks.

In order that the bridges 22, as well as the cross-bars 3 and 16, may be engaged at different points of their length by the keys or the free ends of the key-levers, it is necessary in order to avoid binding and difficult operation of the machine to guide the same exactly parallel. The proper cross-bar or bridge 35 has on both ends perpendicular prolongations, one of which, 36, is toothed, while the other, 37, is connected rotatably and adjustably by a pin and slot with a double lever 35, rotatably located on the frame. In like manner the double lever, on the other hand, is connected with a rack 39, perpendicularly supported on the frame, which engages with a pinion 40, rotated also on the frame, whose opposite side is arranged to engage with a toothed prolongation. The prolongation 37 is guided by a roller 41 and by the side walls of the frame. After the bridge 35 moves up or down the rack 39 will be moved in the opposite direction by means of the toothed prolongation 36 and the pinion 40, which movement is transmitted in the reverse manner to the other end of the cross-bar 35 by the aid of the double lever 38 and the jointed rod 37, so that this must by transmission affect the movement of the end of the rack in the direction of pressure.

Having now described my invention, what I claim, and desire to secure by Letters Patent, is—

1. In an adding-machine, the combination with notched disks and cams rotating therewith, means for rotating the disks, and means actuated by the cams for indicating the totals, substantially as described.

2. In an adding-machine, the combination with notched disks and cams rotating therewith, tongues carrying total-adding keys, the said cams actuating the tongues, bridges actuating the type, the said total-adding keys being arranged to move over the bridges so that when the total-adding keys are depressed on the bridges the corresponding type-levers which have been previously used for printing single items are depressed and affect the impression of the total amount.

3. In an adding-machine, the combination with notched disks, cams, tongues, bridges, and racks actuating the disks, and means for moving said racks into gear by the paper-carriage and keys when depressed, substantially as described.

4. In an apparatus of the type disclosed, the improved means for the adjustment of the paper-carriage to the highest unit, which comprises unit-keys, levers, and cross-bar, the cross-bar being lifted by the ends of the levers, a rack carried by the cross-bar, pinions, the said rack engaging with and setting in rotation the said pinions, and a second rack arranged below the carriage, the said rack being moved forward by the pinions.

5. In an apparatus of the type disclosed, the combination of a cross-bar, a paper-carriage and a series of notched disks, means for connecting the cross-bar to the paper-carriage and to a notched disk, means for limiting the extent of movement of the bar, and means comprising restraining-catches of different heights adapted to engage with the key-levers, the catches being rotatably arranged in such a manner the same are released on movement of the key-levers and are forced into the path of the cross-bar to be lifted, by means of spring-pressure, in order to determine the height of stroke, and therefore the position of the paper-carriage, so that an overstroke is prevented, and therefore the paper-carriage is guided to the proper place value, and the notched disk is rotated about an angle corresponding to the number to be printed, substantially as described.

6. In an adding-machine, the combination with notched disks, cams, tongues, bridges, racks, type-bars, cross-bars, and paper-carriage, and means for parallelly guiding the bridges, the said means being connected with the type-bars, and the cross-bars engaging with the paper-carriage, or cams.

7. In an adding-machine, the combination with notched disks, cams, tongues, bridges, racks, type-bars, cross-bars, paper-carriage and means for parallelly guiding the bridges connected with the type-bars and the cross-bars engaging with the paper-carriage or cam-disks, said cross-bar being provided on the one hand with a vertical rack, and on the other hand connected by a vertical arm to a rotatable double lever, on the other end of which a rack is attached, which engages on one side in a toothed wheel, while the rack connected to the cross-bar engages on the other side of said pivoted toothed wheel, substantially as described.

In witness whereof I have hereunto set my hand in presence of two witnesses.

MICHAEL KUN.

Witnesses:
GÉZA BÉKÉSY,
WILHELM ROSENFELD.